United States Patent
Mottaez et al.

(10) Patent No.: US 8,707,241 B2
(45) Date of Patent: Apr. 22, 2014

(54) PERFORMING SCENARIO REDUCTION USING A DOMINANCE RELATION ON A SET OF CORNERS

(75) Inventors: Amir H. Mottaez, Los Altos, CA (US); Mahesh A. Iyer, Fremont, CA (US)

(73) Assignee: Synopsys, Inc., Mountain View, CA (US)

(*) Notice: Subject to any disclaimer, the term of this patent is extended or adjusted under 35 U.S.C. 154(b) by 319 days.

(21) Appl. No.: 12/847,604

(22) Filed: Jul. 30, 2010

(65) Prior Publication Data
US 2012/0030641 A1    Feb. 2, 2012

(51) Int. Cl.
G06F 17/50    (2006.01)

(52) U.S. Cl.
USPC ............................................. 716/132

(58) Field of Classification Search
USPC ............................................. 716/132
See application file for complete search history.

(56) References Cited

U.S. PATENT DOCUMENTS

| 7,092,838 B1* | 8/2006 | Srinivas et al. | 702/117 |
| 7,739,098 B2* | 6/2010 | Kucukcakar et al. | 703/19 |
| 2006/0026544 A1 | 2/2006 | Engel et al. | |
| 2008/0244476 A1 | 10/2008 | Fotakis et al. | |
| 2009/0100385 A1 | 4/2009 | Baumgartner et al. | |
| 2011/0191740 A1* | 8/2011 | Walker et al. | 716/132 |
| 2011/0302546 A1* | 12/2011 | Mottaez et al. | 716/132 |
| 2011/0302547 A1* | 12/2011 | Mottaez | 716/132 |
| 2012/0030642 A1* | 2/2012 | Mottaez et al. | 716/134 |

* cited by examiner

*Primary Examiner* — Vuthe Siek
*Assistant Examiner* — Mohammed Alam
(74) *Attorney, Agent, or Firm* — Park, Vaughan, Fleming & Dowler LLP; Laxman Sahasrabuddhe

(57) ABSTRACT

Some embodiments of the present invention provide techniques and systems for performing scenario reduction using a dominance relation on a set of corners. During operation, the system can receive a design library which specifies gate characteristics at each corner in a set of corners. Next, the system can use the design library to determine a dominance relation on the set of corners for each gate type. The dominance relations can be stored with the design library. The system can then receive a set of scenarios over which a circuit design is to be optimized. Next, the system can determine a subset of the set of scenarios using one or more dominance relations on the set of corners. The system can then optimize the circuit design over the subset of the set of scenarios.

27 Claims, 5 Drawing Sheets

{ (C1, C3), (C1, C4), (C2, C3), (C2,C4), (C3, C4) }
FIG. 3A
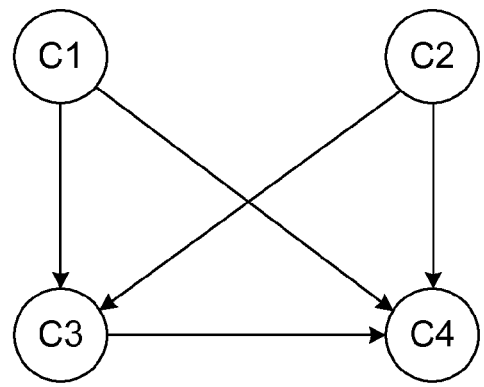
FIG. 3B
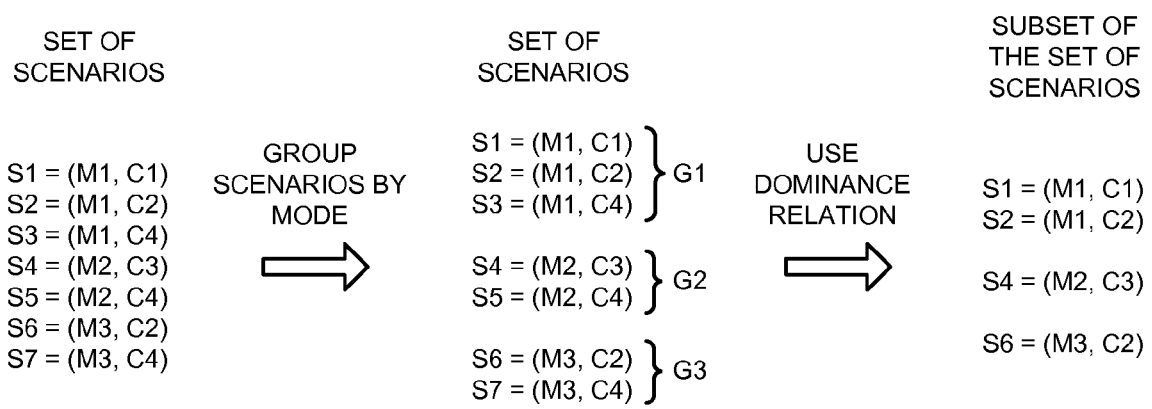
FIG. 4

PERFORMING SCENARIO REDUCTION USING A DOMINANCE RELATION ON A SET OF CORNERS

BACKGROUND

1. Technical Field

This disclosure relates to electronic design automation (EDA). More specifically, this disclosure relates to methods and apparatuses for performing scenario reduction using a dominance relation on a set of corners.

2. Related Art

The relentless miniaturization and increasing complexity of integrated circuits have been key driving forces behind the rapid advances in computer technology.

The advance to smaller semiconductor geometries has increased the variability in process and operating conditions of integrated circuits. A process corner is a particular set of process conditions under which the circuit design may be manufactured. An operating corner is a particular set of operating conditions (e.g., temperature, voltage) under which the circuit design may operate. The term "corner" can refer to a process corner, an operating corner, or a combination thereof.

One reason for the increase in complexity of circuit designs is the introduction of a large number of operational modes (e.g., stand-by, mission, test, etc.). Different operational modes (or "modes" for short) can have drastically different voltages and clock speeds. In fact, some parts of the circuit design may be completely switched off in certain modes.

Note that modes are different from corners. Specifically, modes are design dependent, i.e., the circuit design dictates the different modes in which a circuit design can operate. For example, typical modes for a circuit design include, but are not limited to, a normal mode, a sleep mode, a stand-by mode, and a test mode. On the other hand, a corner depends on the ambient conditions that are expected to occur during manufacturing and/or operation. For example, if a chip is expected to be used over a temperature range of −40° C. to 80° C., then the circuit designer may define multiple corners that are associated with different operating temperatures.

An important goal is to ensure that a circuit design meets the functional and performance requirements under all conditions that are expected to occur. The term "Multi-Corner/Multi-Mode (MCMM) scenario," or "scenario" for short, refers to a combination of a corner and a mode.

Circuit optimization is a complex task that can consume a significant portion of the circuit design time. Therefore, the task of optimizing a circuit design across multiple scenarios can easily become computationally intensive if the number of scenarios is large.

Unfortunately, the number of scenarios over which circuit designs are desired to be optimized is increasing rapidly as semiconductor geometries become smaller and circuit designs become more complex.

SUMMARY

Some embodiments of the present invention provide techniques and systems for reducing the number of scenarios over which a circuit design is optimized. During optimization, the circuit design is modified so that one or more design constraints are met over a set of scenarios, wherein each scenario in the set of scenarios can be associated with a corner and a mode. A corner can be associated with an operating temperature and a power supply voltage. The set of modes can include, but is not limited to, a normal mode, a sleep mode, a standby mode, and a test mode.

In some embodiments, the system can receive a set of scenarios over which the circuit design is to be optimized. Next, the system can determine a subset of the set of scenarios using a dominance relation on the set of corners such that if the circuit design meets a set of design constraints in each scenario in the subset of the set of scenarios, the circuit design is expected to meet the set of design constraints in each scenario in the set of scenarios. The system can then optimize the circuit design over the subset of the set of scenarios. In some embodiments, the system can update circuit information only in the subset of the set of scenarios whenever a gate is changed in the circuit design during optimization, thereby substantially reducing the amount of computation required to optimize the circuit design. Note that a subset of a set can include all or a portion of the set.

In some embodiments, the system can determine the subset of the set of scenarios by removing a first scenario from the set of scenarios if the first scenario and a second scenario in the set of scenarios are associated with the same mode and a first corner associated with the first scenario is dominated by a second corner associated with the second scenario. Note that the second corner dominates the first corner if the delay and output transition time values in the second corner are greater than or equal to the corresponding delay and output transition time values in the first corner over different sized implementations of a gate type, input transition times, and capacitive load values.

The term "gate type" can refer to a family of gates that performs a particular logical function (e.g., AND, OR, NAND, etc.). A library typically includes different sized implementations of each gate type. Each cell in the target technology library that is being used to optimize the circuit design is typically an implementation of a gate type.

In some embodiments, the system can determine the dominance relation on the set of corners as follows. The system can represent the set of corners by a set of points in an n-dimensional space, wherein each corner in the set of corners is associated with a point in the set of points, and wherein each coordinate of a point is associated with the value of a parameter in the corresponding corner. Next, the system can formulate a direct dominance problem on the set of points. The system can then determine the dominance relation on the set of corners by solving the direct dominance problem.

BRIEF DESCRIPTION OF THE FIGURES

FIG. 3A illustrates a dominance relation on a set of corners in accordance with some embodiments of the present invention.

FIG. 3B illustrates a dominance relation on a set of corners in accordance with some embodiments of the present invention.

FIG. 4 illustrates how a dominance relation on a set of corners can be used to perform scenario reduction in accordance with some embodiments of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the principles and features disclosed herein.

Figure 1:
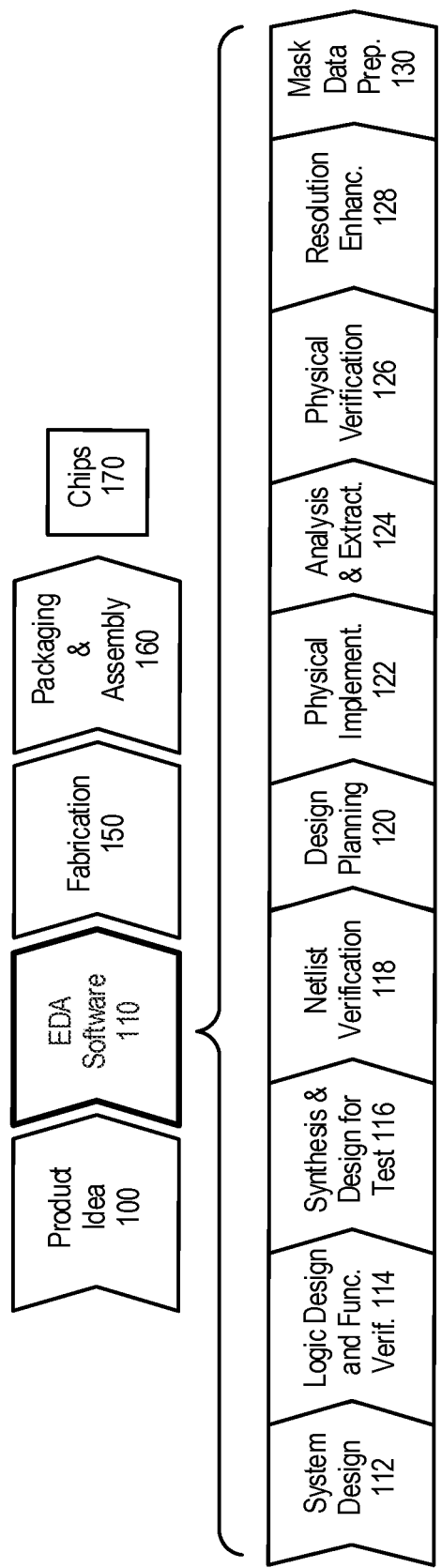
FIG. 1 illustrates various steps in the design and fabrication of an integrated circuit.

FIG. 1 illustrates various steps in the design and fabrication of an integrated circuit. The process starts with a product idea 100, which is realized using Electronic Design Automation (EDA) software 110. Chips 170 can be produced from the finalized design by performing fabrication 150 and packaging and assembly 160 steps.

A design flow that uses EDA software 110 is described below. Note that the design flow description is for illustration purposes only, and is not intended to limit the present invention. For example, an actual integrated circuit design may require a designer to perform the design flow steps in a different sequence than the sequence described below.

In the system design step 112, the designers can describe the functionality to implement. They can also perform what-if planning to refine the functionality and to check costs. Further, hardware-software architecture partitioning can occur at this step. In the logic design and functional verification step 114, a Hardware Description Language (HDL) design can be created and checked for functional accuracy.

In the synthesis and design step 116, the HDL code can be translated to a netlist, which can be optimized for the target technology. Further, tests can be designed and implemented to check the finished chips. In the netlist verification step 118, the netlist can be checked for compliance with timing constraints and for correspondence with the HDL code.

In the design planning step 120, an overall floor plan for the chip can be constructed and analyzed for timing and top-level routing. Next, in the physical implementation step 122, placement and routing can be performed.

In the analysis and extraction step 124, the circuit functionality can be verified at a transistor level. In the physical verification step 126, the design can be checked to correct any functional, manufacturing, electrical, or lithographic issues.

In the resolution enhancement step 128, geometric manipulations can be performed on the layout to improve manufacturability of the design. Finally, in the mask data preparation step 130, the design can be taped-out for production of masks to produce finished chips.

A circuit optimization technique that optimizes a circuit design over a set of scenarios must meet the functional and performance goals (timing, power, area, electrical design rules, etc.) for the circuit design for all the scenarios. Note that, as used in this disclosure, the terms "optimize," "optimizing," "optimization," etc., relate to a process that tries to improve one or more metrics associated with the circuit design. These terms are not intended to imply that a local or a global optimum value is being determined. The metrics could include electrical design rules (e.g., maximum capacitance, maximum transition, maximum fanout), leakage power, area, and timing-related metrics (e.g., Worst Negative Slack (WNS) and Total Negative Slack (TNS)).

Each scenario can be associated with a corner and a mode. For example, a scenario may be associated with a positive defocus process corner and a normal operating mode. If there are no design requirement violations in this scenario, the chip is expected to behave as desired in its normal operating mode, even if the chip was manufactured using a photolithography process that is positively defocused.

Traditional approaches optimize each scenario independently and sequentially. These approaches suffer from poor quality of results and long run-times in converging on an optimal solution for all scenarios. Very often, these techniques fail to converge on an optimal solution because of "ping-pong" effects. For example, if an optimizing transformation performed in one scenario cancels the effects of an optimizing transformation performed in another scenario, the technique may "ping-pong" between these two scenarios, thereby preventing the solution from converging.

Some approaches model all of the scenarios concurrently and construct optimal solutions under the constraints of all scenarios. For example, these approaches evaluate the timing of the circuit by performing static timing analysis for all scenarios, and update timing information for all scenarios when an optimization transformation is applied to a gate. Note that the term "gate" as used in this disclosure can generally refer to any portion of the circuit design that performs a logical function and that may have one or more inputs and one or more outputs. In these approaches, the system optimizes the circuit design based on the slack/timing, leakage power, and DRC information over all scenarios. Although these approaches are superior to approaches that optimize one scenario at a time, they incur additional run-time and memory overhead. This is because, in these approaches, whenever timing, power, and DRC information (e.g., electrical design rules) are updated, they have to be updated across all scenarios. Note that the run-time and memory overhead increase with the number of scenarios. Since the number of scenarios is rapidly increasing as semiconductor geometries become smaller and circuit designs become more complex, these approaches are quickly becoming computationally impractical.

Some embodiments of the present invention overcome the run-time and memory overhead of approaches that concurrently analyze and optimize a circuit design over a set of scenarios by identifying a subset of scenarios that is sufficient for achieving optimal implementation results. Once the subset of scenarios has been identified, the analysis and optimization is performed only over the subset of scenarios. Specifically, timing, power, and DRC analyses are performed only on the subset of scenarios. All other scenarios that do not belong to the subset are not considered during analysis and optimization, thereby reducing the run-time and memory requirements.

A circuit design is typically optimized for a number of constraints or optimization criteria (e.g., timing, power, electrical design rules, etc.) in each of the scenarios for each relevant object (e.g., timing end-point, net, cell, design, etc.) in the design. The system typically uses a design library which provides the optimization process a set of implementations for each gate type. During optimization the system can change the circuit design by replacing an implementation of a gate type in the circuit design with another implementation that is selected from the design library. Each gate type implementation in the design library can have different characteristics. Further, the characteristics of a gate type implementation can vary from one corner to another.

Figure 2:
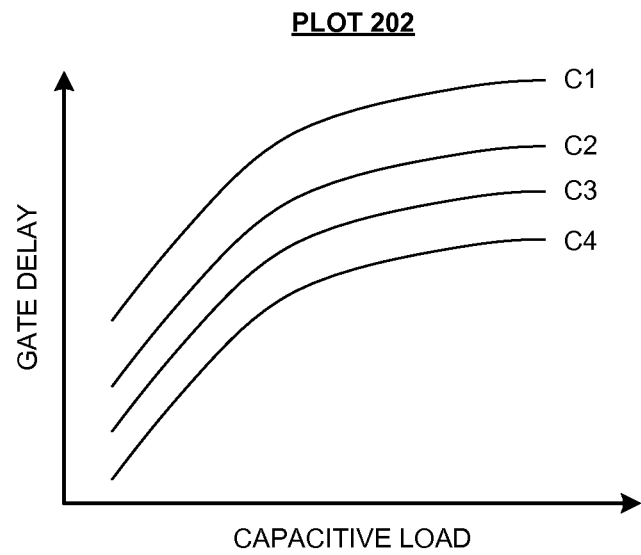
FIG. 2 illustrates delay curves for different corners in accordance with some embodiments of the present invention.
Figure 2:
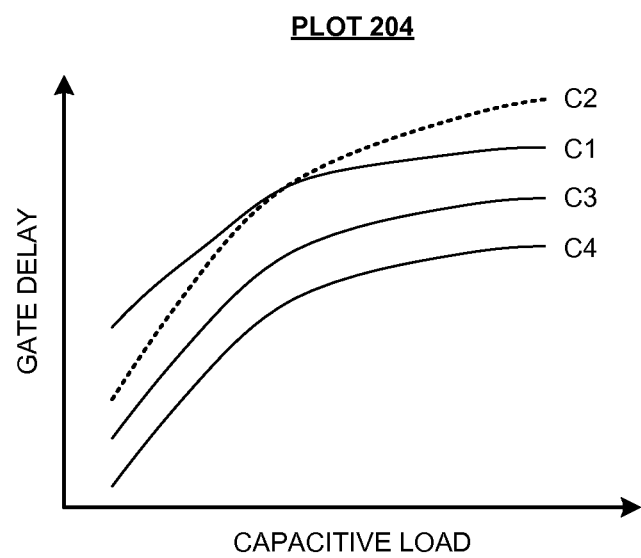

FIG. 2 illustrates delay curves for different corners in accordance with some embodiments of the present invention. Each delay curve represents the variation of the gate delay against the capacitive load for a given implementation of a gate type, input transition value, and corner.

Plot 202 illustrates four delay curves that correspond to corners C1, C2, C3, and C4. Note that these delay curves are for a particular input transition value and a particular gate size (i.e., a particular implementation of a gate type in a technology library). Similar delay curves can be created for other input transition values and implementations of the gate type.

In plot 202, the gate delay in corner C1 is greater than the gate delays in corners C2, C3, and C4 across all capacitive load values. In other words, corner C1 dominates corners C2, C3, and C4. Consider a circuit design that consists of a single gate whose delay characteristics are given by plot 202. If this circuit design meets timing requirements in corner C1, then we can conclude that the circuit design will meet timing requirements in corners C2, C3, and C4. Thus, instead of optimizing this circuit design over all four corners, we only need to optimize the circuit design over corner C1.

Plot 204 illustrates delay curves for a different input transition value and/or a different implementation of the gate type in the same technology library. Specifically, in plot 204, the gate delays in corners C1 and C2 are greater than the gate delays in corners C3 and C4 across all capacitive load values. However, depending on the capacitive load, the gate delay in corner C1 may or may not be greater than the gate delay in corner C2 (the delay curve for corner C2 has been shown as a dotted line to clearly distinguish it from the delay curve for corner C1). In other words, corners C1 and C2 dominate corners C3 and C4. Thus, in this situation, we need to optimize the single gate circuit design in corners C1 and C2 to ensure that the circuit design will meet timing requirements across all corners.

Corner Ci can be said to dominate corner Cj if the gate delay in corner Ci is greater than or equal to the gate delay in corner Cj across all implementations of a gate type, input transitions, and capacitive loads. Similarly, corner Ci can be said to dominate Cj if leakage power values (or electrical design rule values) in Ci are greater than or equal to corresponding leakage power values (or electrical design rule values) in Cj over a set of gate implementations of a gate type.

The notion of dominance can be extended to multiple parameter values (e.g., gate delay, leakage power, electrical design rules, etc.). Specifically, corner Ci can be said to dominate corner Cj if, for each parameter in a set of parameters, the parameter value in corner Ci is greater than or equal to the parameter value in corner Cj across the entire optimization space. A dominance relation D can be defined on a set of corners such that Ci D Cj if and only if corner Ci dominates corner Cj.

FIG. 3A illustrates a dominance relation on a set of corners in accordance with some embodiments of the present invention.

The dominance relation shown in FIG. 3A corresponds to the gate delays shown in plots 202 and 204. In FIG. 3A, the dominance relation is represented as a set of corner tuples, wherein the corner tuple (Ci, Cj) indicates that corner Ci dominates corner Cj. Note that corner C1 would have dominated corner C2 if we had only considered the implementation of the gate type in plot 202. However, since in plot 204 (which corresponds to a different implementation of the gate type) the gate delay in corner C1 is less than the gate delay in corner C2 for at least one data point, corner C1 does not dominate corner C2.

FIG. 3B illustrates a dominance relation on a set of corners in accordance with some embodiments of the present invention.

The dominance relation shown in FIG. 3B corresponds to the gate delays shown in plots 202 and 204. In FIG. 3B, the dominance relation is represented visually as a directed graph, wherein a directed edge (Ci, Cj) indicates that corner Ci dominates corner Cj. The representations in FIGS. 3A and 3B are not intended to be exhaustive or to limit the present invention to the forms disclosed. Accordingly, many different representations of a dominance relation will be apparent to practitioners skilled in the art.

FIG. 4 illustrates how a dominance relation on a set of corners can be used to perform scenario reduction in accordance with some embodiments of the present invention.

Suppose a circuit design needs to be optimized over the set of scenarios {S1, S2, S3, S4, S5, S6, S7}. As shown in FIG. 4, each scenario is a combination of a mode from the set of modes {M1, M2, M3}, and a corner from the set of corners {C1, C2, C3, C4}. Let us assume that the dominance relation on the set of corners {C1, C2, C3, C4} is the same as those illustrated in FIG. 3A or 3B.

The dominance relation on the set of corners can be used to perform scenario reduction as follows. First, the system can group the scenarios based on the associated modes. For example, as shown in FIG. 4, the system can create three scenario groups G1, G2, and G3 by grouping the scenarios based on the associated modes. Next, the system can use the dominance relation on the set of corners to reduce the number of scenarios in each group. For example, since corner C4 is dominated by corners C1 and C2, the system can remove scenario S3 from group G1. Similarly, scenarios S5 and S7 can be removed from groups G2 and G3, respectively. The resulting subset of the set of scenarios consists of scenarios S1, S2, S4, and S6. Note that scenario reduction based on a dominance relation on the set of corners must be performed on a per-mode basis because different modes can have vastly different supply voltages, design constraints, and clock speeds.

The scenario reduction process illustrated in FIG. 4 is for illustration purposes only and is not intended to limit the scope of the present invention. Accordingly, many modifications and variations will be apparent to practitioners skilled in the art. For example, in some embodiments, the system can use the dominance relation on the set of corners to determine a dominance relation on the set of scenarios. Specifically, scenario Si dominates scenario Sj if both Si and Sj are associated with the same mode, and the corner associated with scenario Si dominates the corner associated with scenario Sj. Once a dominance relation on the set of scenarios is determined, the system can determine a dominant subset of scenarios. Let Σ be the set of scenarios. A dominant subset of scenarios, Δ, is a subset of Σ such that every scenario in the set Σ-Δ is dominated by at least one scenario in Δ.

Figure 5:
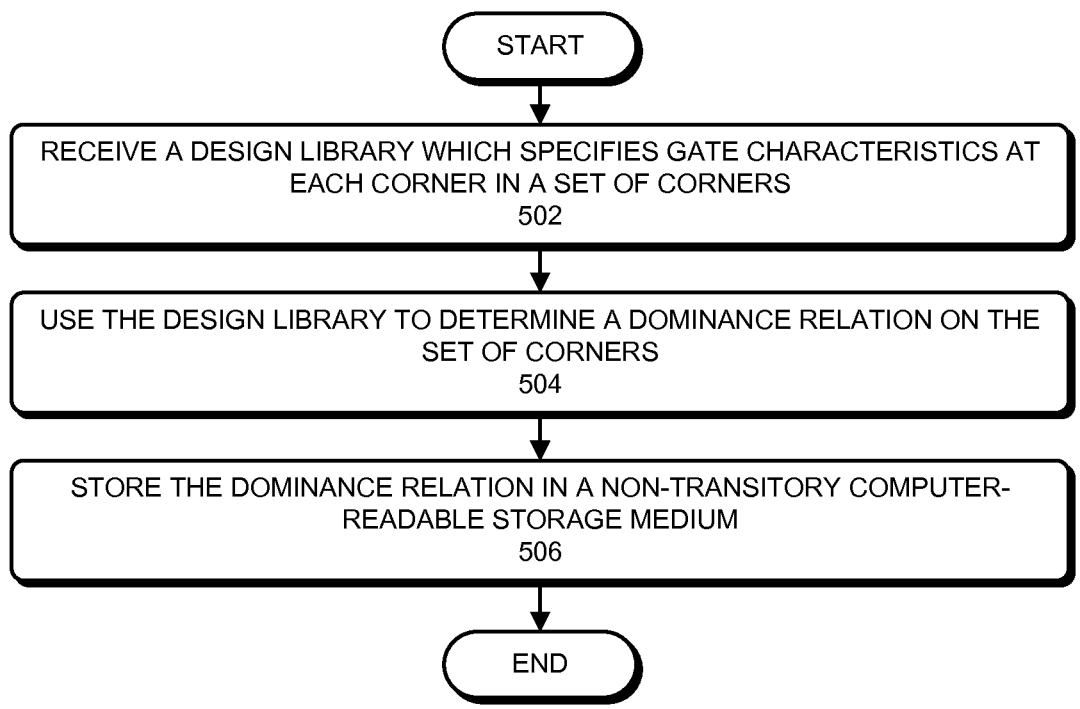
FIG. 5 presents a flowchart that illustrates a process for using library analysis to determine a dominance relation on a set of corners in accordance with some embodiments of the present invention.

FIG. 5 presents a flowchart that illustrates a process for using library analysis to determine a dominance relation on a set of corners in accordance with some embodiments of the present invention.

The process can begin by receiving a design library which specifies gate characteristics at each corner in a set of corners (step 502). The system can then use the design library to determine a dominance relation on the set of corners (step 504). Specifically, in some embodiments, the system can represent the set of corners by a set of points in an n-dimensional space, wherein each corner in the set of corners is associated with a point in the set of points, and wherein each coordinate of a point is associated with the value of a parameter in the corresponding corner. Next, the system can formulate a direct dominance problem on the set of points, and determine the dominance relation on the set of corners by solving the direct dominance problem. Note that a dominance relation on the set of corners can be determined at any level of granularity. Specifically, a dominance relation can be determined for each gate type and/or for the entire design library. A dominance relation can be used to determine a dominant subset of corners. Specifically, let $\Sigma$ be the set of corners. A dominant subset of corners, $\Delta$, is a subset of $\Sigma$ such that every corner in the set $\Sigma$-$\Delta$ is dominated by at least one corner in $\Delta$.

Next, the system can store the dominance relation in a non-transitory computer-readable storage medium (step 506). In some embodiments, the dominance relation can be stored with the design library.

Figure 6:
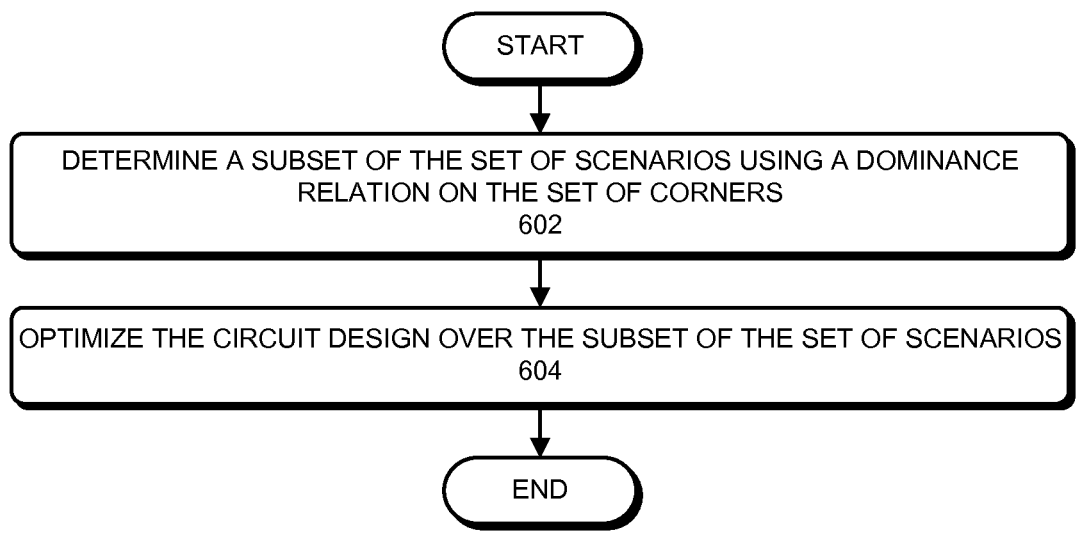
FIG. 6 presents a flowchart that illustrates a process for optimizing a circuit design over a set of scenarios in accordance with some embodiments of the present invention.

FIG. 6 presents a flowchart that illustrates a process for performing scenario reduction using a dominance relation on a set of corners in accordance with some embodiments of the present invention.

The process can begin by determining a subset of the set of scenarios using a dominance relation on the set of corners (step 602). Note that, if the circuit design meets a set of design constraints in each scenario in the subset of the set of scenarios, the circuit design is expected to meet the set of design constraints in each scenario in the set of scenarios. Specifically, the system can determine a subset of the set of scenarios by removing a first scenario from the set of scenarios if the first scenario and a second scenario in the set of scenarios are associated with the same mode and a first corner associated with the first scenario is dominated by a second corner associated with the second scenario.

The system can then optimize the circuit design over the subset of the set of scenarios (step 604). Specifically, the system can update circuit information only in the subset of the set of scenarios whenever a gate is changed in the circuit design during optimization, thereby substantially reducing the amount of computation required to optimize the circuit design over the set of scenarios.

Note that a design library can include a large number of gate types. As explained above, the system can determine a dominant subset of corners for each gate type in the design library. In some embodiments, the system can consider dominant subsets of corners associated with all gate types regardless of which gate types are expected to be used during optimization. Alternatively, the system can first identify the gate types that are expected to be used during optimization, and then use only those dominant subsets of corners that are associated with the identified gate types.

Figure 7:
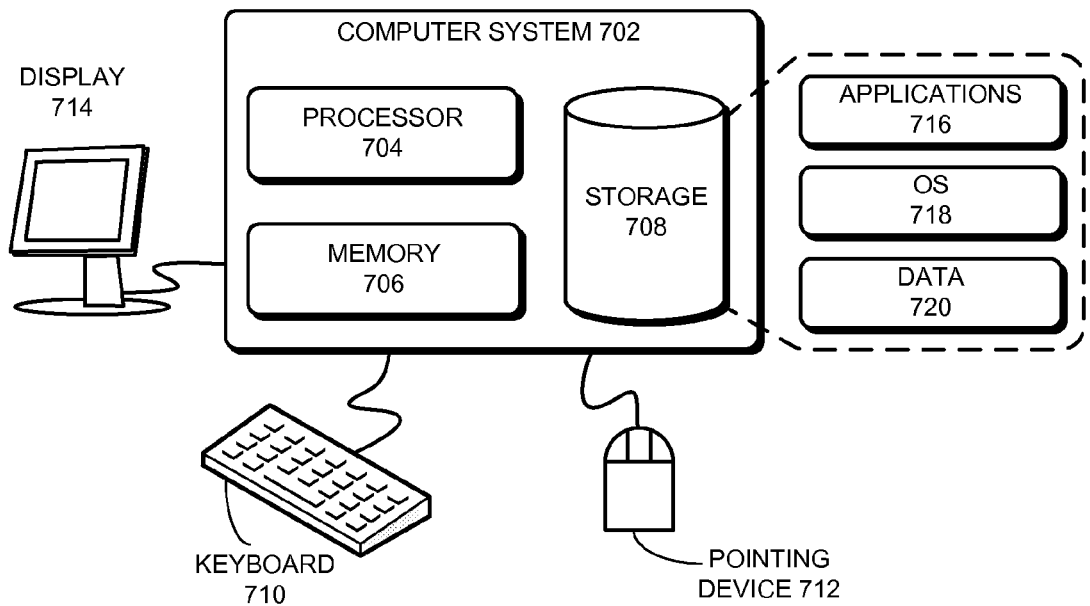
FIG. 7 illustrates a computer system in accordance with some embodiments of the present invention.

FIG. 7 illustrates a computer system in accordance with some embodiments of the present invention.

Computer system 702 can include processor 704, memory 706, and storage device 708. Computer system 702 can be coupled to display device 714, keyboard 710, and pointing device 712. Storage device 708 can store operating system 718, applications 716, and data 720.

Applications 716 can include instructions which, when executed by computer system 702, can cause computer system 702 to perform processes which are inherently or explicitly described in this disclosure. Data 720 can include any data that is required as input or that is generated as output by processes which are inherently or explicitly described in this disclosure.

Figure 8:
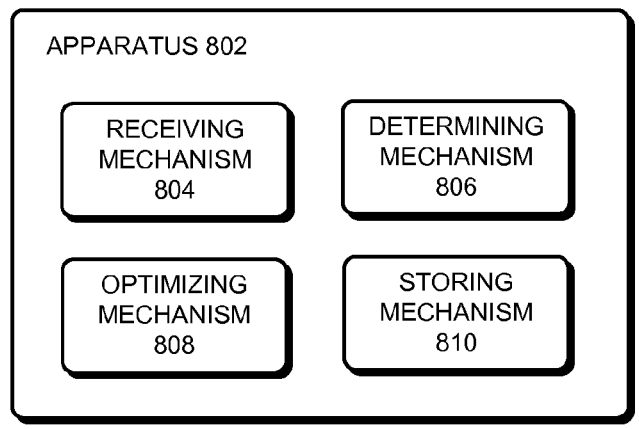
FIG. 8 illustrates an apparatus in accordance with some embodiments of the present invention.

FIG. 8 illustrates an apparatus in accordance with some embodiments of the present invention.

Apparatus 802 can comprise a plurality of mechanisms which may communicate with one another via a wired or wireless communication channel. Apparatus 802 may be realized using one or more integrated circuits, and apparatus 802 may include fewer or more mechanisms than those shown in FIG. 8. Further, apparatus 802 may be integrated in a computer system, or it may be realized as a separate device which is capable of communicating with other computer systems and/or devices.

Apparatus 802 can include one or more mechanisms which are configured to perform operations which are inherently or explicitly described in this disclosure. Specifically, apparatus 802 can include receiving mechanism 804, determining mechanism 806, optimizing mechanism 808, and storing mechanism 810.

In some embodiments, receiving mechanism 804 can be configured to receive a set of scenarios, wherein each scenario is a combination of a mode from a set of modes and a corner from a set of corners. Determining mechanism 806 can be configured to determine a subset of the set of scenarios using a dominance relation on the set of corners. Optimizing mechanism 808 can be configured to optimize a circuit design over the subset of the set of scenarios.

In some embodiments, receiving mechanism 804 can be configured to receive a design library that specifies circuit characteristics over a set of corners, determining mechanism 806 can be configured to determine a dominance relation on the set of corners, and storing mechanism 810 can be configured to store the dominance relation on the set of corners in a non-transitory computer-readable storage medium.

CONCLUSION

The above description is presented to enable any person skilled in the art to make and use the embodiments. Various modifications to the disclosed embodiments will be readily apparent to those skilled in the art, and the general principles defined herein are applicable to other embodiments and applications without departing from the spirit and scope of the present disclosure. Thus, the present invention is not limited to the embodiments shown, but is to be accorded the widest scope consistent with the principles and features disclosed herein.

The data structures and code described in this disclosure can be partially or fully stored on a computer-readable storage medium and/or a hardware module and/or hardware apparatus. A computer-readable storage medium includes, but is not limited to, volatile memory, non-volatile memory, magnetic and optical storage devices such as disk drives, magnetic tape, CDs (compact discs), DVDs (digital versatile discs or digital video discs), or other media, now known or later developed, that are capable of storing code and/or data. Hardware modules or apparatuses described in this disclosure include, but are not limited to, application-specific integrated circuits (ASICs), field-programmable gate arrays (FPGAs), dedicated or shared processors, and/or other hardware modules or apparatuses now known or later developed.

The methods and processes described in this disclosure can be partially or fully embodied as code and/or data stored in a computer-readable storage medium or device, so that when a computer system reads and executes the code and/or data, the computer system performs the associated methods and processes. The methods and processes can also be partially or fully embodied in hardware modules or apparatuses, so that when the hardware modules or apparatuses are activated, they perform the associated methods and processes. Note that the methods and processes can be embodied using a combination of code, data, and hardware modules or apparatuses.

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for optimizing a circuit design over a set of scenarios, wherein each scenario is associated with a corner from a set of corners and a mode from a set of modes, the method comprising:

determining, by computer, a subset of the set of scenarios based on a dominance relation on the set of corners such that if the circuit design meets a set of design constraints in each scenario in the subset of the set of scenarios, the circuit design is expected to meet the set of design constraints in each scenario in the set of scenarios; and wherein determining the subset of the set of scenarios based on the dominance relation on the set of corners includes removing a first scenario from the set of scenarios if the first scenario and a second scenario in the set of scenarios are associated with the same mode and a first corner associated with the first scenario is dominated by a second corner associated with the second scenario; and optimizing the circuit design over the subset of the set of scenarios.

2. The method of claim 1, wherein a second corner dominates a first corner if delay and output transition time values in the second corner are greater than or equal to corresponding delay and output transition time values in the first corner over a set of implementations of a gate type, input transition times, and capacitive load values.

3. The method of claim 1, wherein a second corner dominates a first corner if leakage power values in the second corner are greater than or equal to corresponding leakage power values in the first corner over a set of gate implementations of a gate type.

4. The method of claim 1, wherein a second corner dominates a first corner if electrical design rule values in the second corner are greater than or equal to corresponding electrical design rule values in the first corner over a set of gate implementations of a gate type.

5. The method of claim 1, further comprising:

representing the set of corners by a set of points in an n-dimensional space, wherein each corner in the set of corners is associated with a point in the set of points, and wherein each coordinate of a point is associated with the value of a parameter in the corresponding corner;

formulating a direct dominance problem on the set of points; and determining the dominance relation on the set of corners by solving the direct dominance problem.

6. The method of claim 1, wherein circuit information is updated only in the subset of the set of scenarios whenever a gate is changed in the circuit design during optimization.

7. The method of claim 1, wherein the subset of the set of scenarios is determined based on dominant subsets of corners associated with gate types in a library.

8. The method of claim 1, wherein determining the subset of the set of scenarios based on the dominance relation on the set of corners includes:

determining gate types that are expected to be used during optimization; and determining the subset of the set of scenarios based on dominant subsets of corners associated with the gate types.

9. A non-transitory computer-readable storage medium storing instructions that when executed by a computer cause the computer to perform a method for optimizing a circuit design over a set of scenarios, wherein each scenario is associated with a corner from a set of corners and a mode from a set of modes, the method comprising:

determining a subset of the set of scenarios based on a dominance relation on the set of corners such that if the circuit design meets a set of design constraints in each scenario in the subset of the set of scenarios, the circuit design is expected to meet the set of design constraints in each scenario in the set of scenarios; and wherein determining the subset of the set of scenarios based on the dominance relation on the set of corners includes removing a first scenario from the set of scenarios if the first scenario and a second scenario in the set of scenarios are associated with the same mode and a first corner associated with the first scenario is dominated by a second corner associated with the second scenario; and optimizing the circuit design over the subset of the set of scenarios.

10. The non-transitory computer-readable storage medium of claim 9, wherein determining the subset of the set of scenarios based on the dominance relation on the set of corners includes removing a first scenario from the set of scenarios if the first scenario and a second scenario in the set of scenarios are associated with the same mode and a first corner associated with the first scenario is dominated by a second corner associated with the second scenario.

11. The non-transitory computer-readable storage medium of claim 9, wherein a second corner dominates a first corner if the delay and output transition time values in the second corner are greater than or equal to the corresponding delay and output transition time values in the first corner over a set of implementations of a gate type, input transition times, and capacitive load values.

12. The non-transitory computer-readable storage medium of claim 9, wherein a second corner dominates a first corner if leakage power values in the second corner are greater than or equal to corresponding leakage power values in the first corner over a set of gate implementations of a gate type.

13. The non-transitory computer-readable storage medium of claim 9, wherein a second corner dominates a first corner if electrical design rule values in the second corner are greater than or equal to corresponding electrical design rule values in the first corner over a set of gate implementations of a gate type.

14. The non-transitory computer-readable storage medium of claim 9, further comprising:

representing the set of corners by a set of points in an n-dimensional space, wherein each corner in the set of corners is associated with a point in the set of points, and wherein each coordinate of a point is associated with the value of a parameter in the corresponding corner;

formulating a direct dominance problem on the set of points; and determining the dominance relation on the set of corners by solving the direct dominance problem.

15. The non-transitory computer-readable storage medium of claim 9, wherein circuit information is updated only in the subset of the set of scenarios whenever a gate is changed in the circuit design during optimization.

16. The non-transitory computer-readable storage medium of claim 9, wherein the subset of the set of scenarios is determined based on dominant subsets of corners associated with gate types in a library.

17. The non-transitory computer-readable storage medium of claim 9, wherein determining the subset of the set of scenarios based on the dominance relation on the set of corners includes:
  determining gate types that are expected to be used during optimization; and
  determining the subset of the set of scenarios based on dominant subsets of corners associated with the gate types.

18. An apparatus for optimizing a circuit design over a set of scenarios, the apparatus comprising:
  a determining mechanism configured to determine a subset of the set of scenarios based on a dominance relation on the set of corners such that if the circuit design meets a set of design constraints in each scenario in the subset of the set of scenarios, the circuit design is expected to meet the set of design constraints in each scenario in the set of scenarios;
  and wherein determining the subset of the set of scenarios based on the dominance relation on the set of corners includes removing a first scenario from the set of scenarios if the first scenario and a second scenario in the set of scenarios are associated with the same mode and a first corner associated with the first scenario is dominated by a second corner associated with the second scenario; and
  an optimizing mechanism configured to optimize the circuit design over the subset of the set of scenarios.

19. The apparatus of claim 18, wherein the determining mechanism is configured to remove a first scenario from the set of scenarios if the first scenario and a second scenario in the set of scenarios are associated with the same mode and a first corner associated with the first scenario is dominated by a second corner associated with the second scenario.

20. The apparatus of claim 18, wherein a second corner dominates a first corner if delay and output transition time values in the second corner are greater than or equal to corresponding delay and output transition time values in the first corner over a set of implementations of a gate type, input transition times, and capacitive load values.

21. The apparatus of claim 18, wherein a second corner dominates a first corner if leakage power values in the second corner are greater than or equal to corresponding leakage power values in the first corner over a set of gate implementations of a gate type.

22. The apparatus of claim 18, wherein a second corner dominates a first corner if electrical design rule values in the second corner are greater than or equal to corresponding electrical design rule values in the first corner over a set of gate implementations of a gate type.

23. The apparatus of claim 18, further comprising:
  a representing mechanism configured to represent the set of corners by a set of points in an n-dimensional space, wherein each corner in the set of corners is associated with a point in the set of points, and wherein each coordinate of a point is associated with the value of a parameter in the corresponding corner;
  a formulating mechanism configured to formulate a direct dominance problem on the set of points; and
  a second determining mechanism configured to determine the dominance relation on the set of corners by solving the direct dominance problem.

24. The apparatus of claim 18, wherein the optimizing mechanism is configured to update circuit information only in the subset of the set of scenarios whenever a gate is changed in the circuit design during optimization.

25. The apparatus of claim 18, wherein the determining mechanism is configured to determine the subset of the set of scenarios based on dominant subsets of corners associated with gate types in a library.

26. The apparatus of claim 18, wherein the determining mechanism is configured to:
  determine gate types that are expected to be used during optimization; and
  determine the subset of the set of scenarios based on dominant subsets of corners associated with the gate types.

27. The method of claim 1, wherein the method further comprises determining the dominance relation on the set of corners by analyzing a design library.

* * * * *